Figure 1:
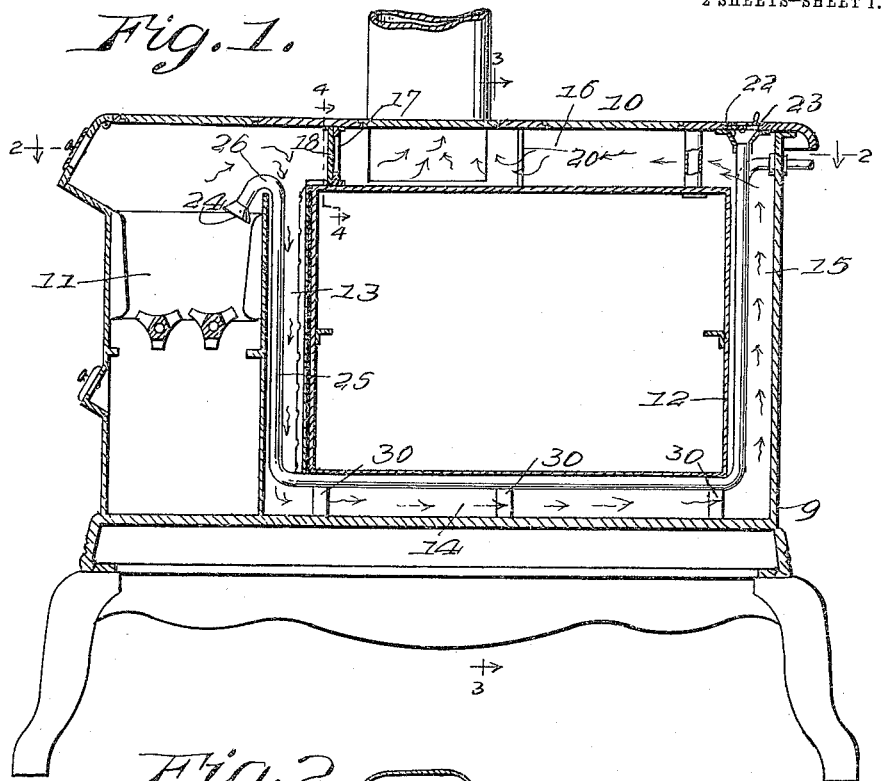

J. F. JAMES.
STOVE.
APPLICATION FILED APR. 18, 1913.

1,127,254.

Patented Feb. 2, 1915.
2 SHEETS—SHEET 1.

Witnesses
Pearl Putnam
L. C. Barkley

Inventor,
James F. James,
By Frank S. Appleman,
Attorneys

J. F. JAMES.
STOVE.
APPLICATION FILED APR. 18, 1913.
1,127,254.
Patented Feb. 2, 1915.
2 SHEETS—SHEET 2.
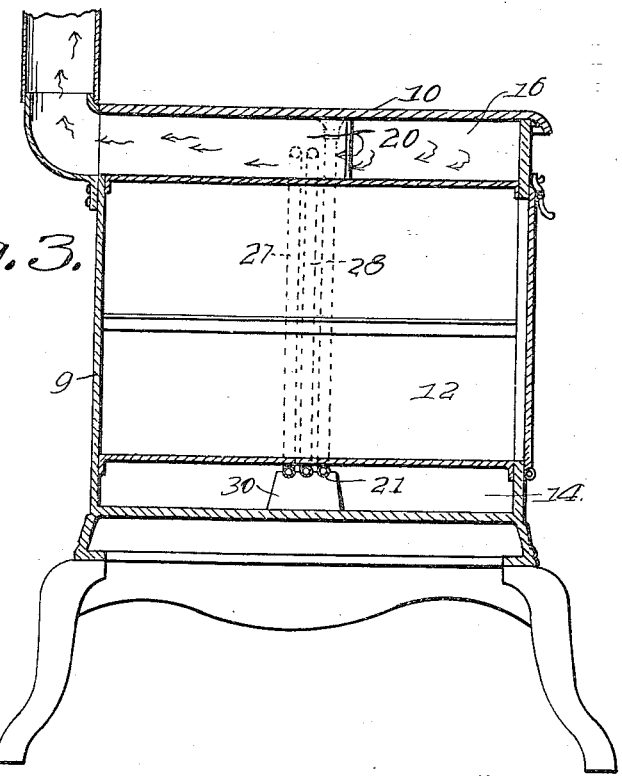
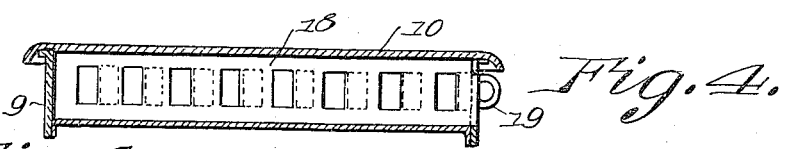
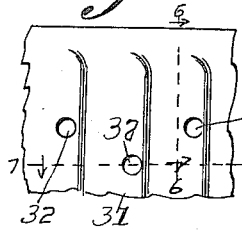
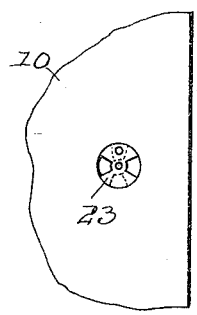
Witnesses
Pearl Putnam
L. E. Barkley
Inventor
James F. James,
By Franks Appleman,
Attorneys

UNITED STATES PATENT OFFICE.

JAMES F. JAMES, OF DALTON, GEORGIA.

STOVE.

1,127,254. Specification of Letters Patent. Patented Feb. 2, 1915.

Application filed April 18, 1913. Serial No. 762,033.

*To all whom it may concern:*

Be it known that I, JAMES F. JAMES, a citizen of the United States of America, and resident of Dalton, in the county of Whitfield and State of Georgia, have invented certain new and useful Improvements in Stoves, of which the following is a specification.

This invention relates to stoves and furnaces and particularly to a class thereunder known as cooking stoves.

An object of this invention is to provide novel means for controlling the circulation of the products of combustion with respect to the oven of a cooking stove in order that the heat in the products of combustion may be effectively employed for heating the culinary articles on the stove and for cooking the contents of the oven, novel means being provided for causing the said products of combustion to travel circuitously from the fire pot to the discharge for the products of combustion, usually termed a stove pipe for the purpose, as stated, of utilizing to the greatest degree, heat generated in the fire pot.

A still further object of this invention is to provide a damper between the top of the stove and the top of the oven or in position to guard the passage therebetween, the said damper being of a type which will prevent the products of combustion from traveling diagonally from the fire pot to the discharge opening or pipe in order that the said products of combustion may be caused to travel under the top of the stove and over the oven rearwardly to a certain degree but directing its travel toward the pipe, the said damper being furthermore capable of blocking the passage from the fire pot directly to the space between the top of the stove and the oven, thereby causing the products of combustion to traverse a passage between the fire pot and the front of the oven and through the flues or passages under and to the rear of the oven and thence over the oven between the said oven and the top of the stove to the pipe; furthermore, an object of this invention is to provide a space between the top of the stove and the oven with a flue strip guarding the passage of the products of combustion directly to the pipe but deflecting the said products of combustion around the end of the flue strip in order that the heat may be caused to traverse the space between the top of the stove and the oven along the side thereof opposite that to which the pipe is connected, thus preventing a diagonal travel of the products of combustion from the outer side of the stove toward the pipe.

A still further object of this invention is to provide novel means for supplying air to the fire pot above the fire bed in order that combustion may be supported and in order that the heat generated by a given quantity of fuel will be proportionately increased as compared with stoves which are not supplied with air feeding means, it being a part of the present invention that the said air supply pipes form a support for the oven and tend to strengthen the structure in which the oven is a part.

A still further object of this invention is to provide water heating pipes arranged within the flue chambers of a stove and extending longitudinally and vertically therein so that a maximum length of pipe may be subjected to the action of the heat contained in the products of combustion in its travel from the fire pot to the pipe.

A still further object of this invention is to provide a vent extending from within the oven to the exterior of the stove case to permit odors to escape from the oven.

A still further object of the invention is to provide a guard or sheathing for the end of the oven near the fire pot to prevent injury to the material of which the oven is formed, due to the intense heat in its passage from the fire box through the flue at the end of the oven, the said sheathing furthermore preventing the end of the oven from becoming superheated as compared with the other portion thereof.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 2:
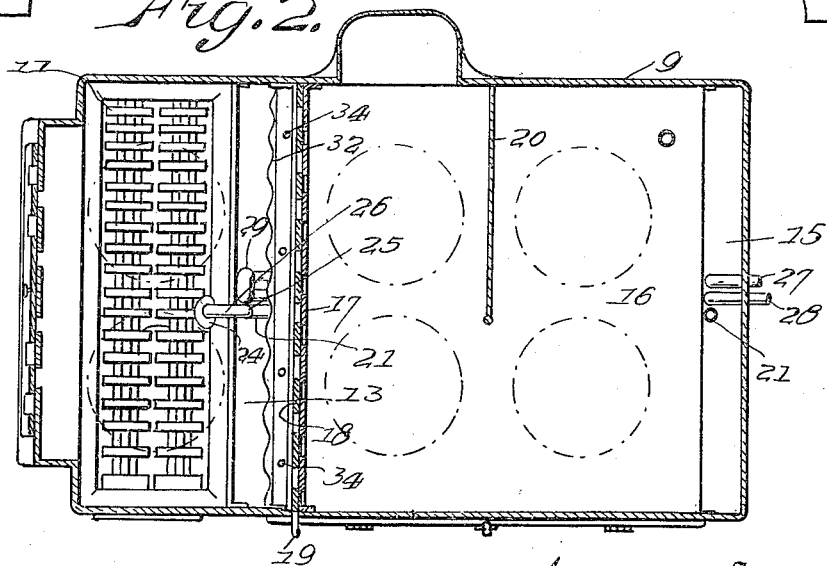

Figure 1 illustrates a longitudinal vertical sectional view of a stove embodying the invention; Fig. 2 illustrates a section on the line 2—2 of Fig. 1; Fig. 3 illustrates a sectional view on a line corresponding with the line 3—3 of Fig. 1; Fig. 4 illustrates a sectional view on a line corresponding with the line 4—4 of Fig. 1; Fig. 5 illustrates a view in elevation of a fragment of the sheathing for the end of the oven; Fig. 6 illustrates a sectional view on the line 6—6 of Fig. 5; Fig. 7 illustrates a sectional view on the line 7—7 of Fig. 5; and Fig. 8 illustrates a top plan of a fragment of the top of the stove.

In these drawings 9 denotes the stove casing which may be supported in any appropriate way and 10 the top thereof, the said casing being provided with a fire pot 11 of any appropriate type spaced apart from the oven 12, which oven is supported within the casing and spaced apart from the casing to form a flue or channel therearound. The vertically disposed flue 13 is provided between the oven and the fire pot, and the horizontally disposed portion 14 of the said flue is between the bottom of the oven and the bottom of the casing, and the said horizontally disposed portion of the flue merges with the vertically disposed portion 15 of the flue which is at the end of the casing remote from the fire pot, whereas the upper horizontally disposed portion 16 of the flue is between the top 10 of the stove and the oven.

An apertured plate 17 is interposed between the top 10 of the stove and the top of oven at the end of the oven near the fire pot and forms one member of a damper with which a sliding plate 18, which is also apertured, coacts, as the other member of the damper, it being the purpose of the inventor to have the sliding plate 18 extend beyond the casing and terminate in a handle 19 which may be manipulated by an operator for the purpose of causing the apertures in the sliding plate and the apertures in the stationary plate to aline when the products of combustion are to pass through the said damper to the pipe or for closing the apertures in the plates when the products of combustion are to be directed circuitously around the oven to the said pipe. Owing to the fact that the alining apertures of the damper may be adjusted with relation to each other according to the volume of products of combustion to allow the products of combustion to pass therethrough, it follows that the said products will pass through the apertures throughout the length of the damper, and therefore, the products of combustion cannot pass obliquely from the fire pot to the pipe, when the openings are properly adjusted, but must first pass longitudinally of the casing through the said apertures of the damper, before they are under the influence of the direct suction through the pipe.

When the products of combustion are caused to traverse the circuitous route heretofore described under the oven and over the top thereof, the said products are drawn by the suction through the pipe and in order to prevent the said products from traveling obliquely across the top of the oven, a flue strip 20 is interposed in vertical position between the top 10 of the stove and the oven, the said flue strip extending from the rear wall and at one side of the pipe transversely of the casing forming a baffle to the direct travel of the products of combustion toward the pipe and causing the said products of combustion to circulate around the end of the flue strip and thence to the pipe, thus providing for the utilization of the heat in its passage from the fire pot to the pipe.

It will be obvious that the distribution of heat is effective for uniformly heating the oven and the top of the stove as well, the said heat being caused to pass under every lid opening of the stove by reason of the arrangement of parts just described.

In order to support combustion in the fire pot, the flue between the casing and the oven contains an air pipe 21 which, at one end, is connected to a fitting 22 which may be secured to the top of the stove in any appropriate way and the top of the stove has an ordinary valve 23 for controlling the passage of air to the pipe 21. The pipe 21 extends vertically at one end of the oven and horizontally thereunder and that portion of the said pipe which projects into the fire pot is flared as shown at 24, so that the air delivered to the fire pot is diffused over the fire bed to increase the efficiency of the air delivery. That portion 25 of the pipe which stands vertically between the oven and the fire pot has a goose neck 26 embracing a portion of the edge of the rear wall of the fire pot, so that the air passing therethrough may be discharged downwardly over the surface of the fire bed.

It is a further object of the invention, as stated, to utilize the heat in the products of combustion for raising the temperature of water contained in a pipe and for the purpose of effecting the circulation of water, I show two parallel pipes 27 and 28 extending through the end of the casing and parallel thereafter with the air pipe 21, the position of which has been fully described. The inner ends of the pipes 27 and 28 are connected by a loop 29 so that water may flow into one pipe and out of the other through the loop and in its travel it will become heated to fulfil the object of the invention stated.

In addition to the function of the pipes 21, 27 and 28 heretofore described, said pipes are furthermore utilized as supports for the oven as shown in Fig. 1, the said pipes being in turn held in place by bridges 30 of such number and in such relation to one another as to hold the pipes in place.

That portion of the invention which is designed for the protection of the end of the oven consists of a corrugated plate 31 provided with apertures 32 for the circulation of air therethrough and the said plate 31 is suspended over the end wall of the oven by having its upper edge 33 bent at an angle to overlie the upper corner of the oven to which it is attached by fastenings 34, stove bolts, or other appropriate means. By reason of the simplicity of construction of this sheathing, it can be readily applied or removed should it become impaired by heat or otherwise.

From what has been said, it will be obvious that a stove manufactured in accordance with this invention will possess advantages in points of simplicity and efficiency, and that it will be comparatively inexpensive to produce and maintain. The economy in use, that is in the fuel consumption is of vast importance and the means for utilizing the heat to the maximum degree fulfils the requirements indicated above.

I claim—

1. In a stove, a casing having a chimney opening and a fire box, an oven in the casing, said oven being supported in the casing to provide a flue adjacent the ends and top and bottom thereof, a sheathing supported between the fire box and front wall of the oven, said sheathing comprising a corrugated apertured plate having a right angled end portion, the right angled end portion adapted to overlie a portion of the oven for holding the sheathing into engagement with the front wall of the oven, and means in the flues for directing heated air to the fire box.

2. In a stove, a casing having a chimney opening and a fire box, an oven in the casing, the oven being arranged to provide with the casing a flue adjacent the top and bottom and ends of the oven, a pipe extending through the flues, the intermediate portion of the pipe being looped and supported directly under the oven, one end of the pipe being in communication with the atmosphere, the opposite end being flared and terminating above the fire box for delivering air thereto, and a sheathing supported adjacent the forward end of the oven.

In testimony whereof, I affix my signature in the presence of two witnesses.

JAMES F. JAMES.

Witnesses:
LOTTIE E. BARKLEY,
PEARL PUTNAM.

Copies of this patent may be obtained for five cents each, by addressing the "Commissioner of Patents, Washington, D. C."